Feb. 17, 1970 F. J. HASKINS ET AL 3,496,008
METHOD OF FORMING THIN FILMS FOR FERROELECTRIC DEVICES
Filed Sept. 12, 1966
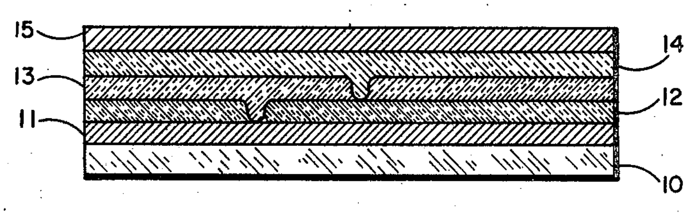
INVENTOR.
FREDRICK J. HASKINS
ALLAN G. BALMER
BY Raymond L Owens
ATTORNEY United States Patent Office 3,496,008
Patented Feb. 17, 1970

3,496,008

METHOD OF FORMING THIN FILMS FOR FERROELECTRIC DEVICES

Frederick J. Haskins, Rochester, and Allan G. Balmer, Pittsford, N.Y., assignors to General Dynamics Corporation, a corporation of Delaware Filed Sept. 12, 1966, Ser. No. 578,731
Int. Cl. C23b *5/50;* C04b *35/64;* B44d *1/46*
U.S. Cl. 117—215 2 Claims

ABSTRACT OF THE DISCLOSURE

A method of forming a ceramic ferroelectric device is disclosed. A ferroelectric material such as barium titanate, lead zirconate titanate or lead titanate, is powdered and milled with distilled water to form a suspension having a powder to water weight ratio of about 3 to 5. The suspension is thinned to a powder to water ratio of 1 to 5. A first thin layer is sprayed onto a substrate, dried and sintered. A second layer is then sprayed over the first layer and sintered. Pinhole free films result.

The present invention relates to methods of forming thin ferroelectric films.

Ferroelectric films have been effectively employed in capacitors and in memory storage devices of the type described in the U.S. copending patent application, Ser. No. 341,297, filed Jan. 30, 1964, and now abandoned filed in the name of J. W. Gratian, entitled "Information Handling Apparatus," and owned by the assignee of the present invention.

Several processes are currently used to produce ferroelectric films. A green potentially ferroelectric film (viz. one before sintering) may, for example, be formed by screening or by vacuum-deposition on a suitable substrate, and converted to the ferroelectric structure by subsequent sintering. Bulk sintered ferroelectric materials have also been ground to form thin films. All of these prior art methods have drawbacks; for example, the grinding process is time-consuming and is restricted to relatively thick films; the vacuum-deposition process is also lengthy and requires expensive equipment; the screening process involves the use of an organic type binder vehicle which either tends to distort the film as it volatilizes during sintering or else is so viscous as to prevent the formation of a smooth film. In addition, films formed by the above processes all generally contain objectionable electrical shorting paths due to pinholes.

In view of the foregoing, an object of the present invention is to provide an improved method of forming ferroelectric films which avoids the afore-mentioned disadvantages.

A further object of the invention is to provide an inexpensive means of forming thin ferroelectric films free from the electrical shorting paths caused by pin holes, which are found in prior art thin films.

A still further object of this invention is to provide an efficient but simple method of forming thin films which does not require the use of an organic binder.

A further object of this invention is to provide a method of forming thin films on substrates having larger surface areas than has heretofore been possible.

A still further object of this invention is to provide a method which is suitable for forming films upon irregular surfaces.

An exemplary method in accordance with the present invention may consist of spraying at least one but preferably several thin layers of an aqueous suspension of a powdered material which is potentially ferroelectric upon a substrate. Each film layer is sintered just after its deposit. By the application of a plurality of layers, the formation of electrical shorting paths, which have characterized certain prior art arrangements, are substantially eliminated.

The invention itself, both as to its organization and method of operation, as well as additional objects and advantages thereof, will become more readily apparent from a reading of the following description, taken in combination with the accompanying drawing, which is a diagrammatic illustration in cross-sectional elevation of a device formed in accordance with the invention, and which is exaggerated in detail to facilitate an understanding of the invention.

In accordance with the invention a potentially ferroelectric material in powder form is mixed by being ball-milled in water to form a suspension with a consistency which resembles that of heavy cream. For a specific example, in the case of barium titanate, during mixing, the approximate powder to water weight ratio is 3:5. The mixed suspension is then diluted to a consistency suitable for spraying with a conventional spray apparatus. One such apparatus which has been found suitable for use in the case of barium titanate is a DeVilbiss type TGA gun, which operates at about 50–60 lbs. atomizing pressure with the mix suspension being diluted to approximately one part barium titanate to five parts water.

In accordance with the invention, the diluted suspension may be sprayed onto any one of a variety of substrates (illustrated by the number 10) which may, for example, be either a refractory metal such as tungsten or platinum, or a refractory insulator such as fused alumina which has previously been coated with a metallic electrode. It has been found that a device is best formed by aplying several thin spray film coats forming layers 11, 12, 13 and 14. On the other hand, a device formed by spraying but a single layer can be effectively made in accordance with the invention and has many advantageous features. Before the application of each additional layer, each layer is oven-dried, and then sintered to produce the ceramic ferroelectric structure. Any conventional sintering process well known in the art may be employed to accomplish this step. A top electrode 15 may then be applied to the top sintered layer 14 to complete the device. The electrode 15 may be formed by a number of deposition techniques such as spraying a suspension of metals or metallic salts of say for example, platinum or palladium with or without an inorganic binder onto the top layer 14. The device should then be heated to the proper temperature to either fuse or convert (in the case of salts) the deposit.

As shown, the ceramic device produced in this manner has uniform characteristics because it is free from electrical shorting paths which have plauged the prior art films in that each subsequent layer will fill in the pin holes present in the previous layer. The danger of having shorts may be even further reduced by increasing the number of additional sprayed and sintered layers.

Without limitation but by way of example only, a suspension of barium titanate having a viscosity approximately that of heavy cream has been thinned to spraying viscosity, and subsequently sprayed onto a smooth surface of a substrate such as glass or quartz to a thickness ranging from about .0001 inch to .005 inch.

The foregoing is but one exemplary method in accordance with the invention and therefore should be considered to be only illustrative, as modifications and variations in the invention will undoubtedly occur to those skilled in the art. For example, other potentially ferroelectric materials such as lead zirconate titanate, and lead titanate could be used in place of barium titanate. Accordingly, the foregoing description is to be considered merely as being illustrative and not in any sense limiting.

What is claimed is:

1. A method of forming a ceramic ferroelectric device comprising the steps of (a) powdering a ferroelectric material,
(b) milling said powder material with distilled water to form an aqueous suspension characterized by a powder to water weight ratio of about 3:5,
(c) thinning said suspension to approximately one part ferroelectric material to five parts water,
(d) spraying a first layer of said thinned suspension having a thickness in a range of from about .0001 to .005 inch, onto a substrate,
(e) drying said first layer,
(f) sintering said first layer,
(g) spraying a second layer of said suspension in superimposed relation onto said first layer, said second film having a thickness of from about .0001 to .005 inch, and
(h) sintering said second layer to form said ceramic ferroelectric device.

2. The method as set forth in claim 1 wherein said ferroelectric material is selected from the group consisting of barium titnate, lead zirconate titanate, and lead titanate.

References Cited

UNITED STATES PATENTS

| | | | |
|---|---|---|---|
| 2,064,173 | 12/1936 | McGohan. | |
| 2,759,854 | 8/1956 | Kilby | 117—217 |
| 2,775,531 | 12/1956 | Montgomery et al. | |
| 3,305,394 | 2/1967 | Kaiser et al. | 117—215 X |

ALFRED L. LEAVITT, Primary Examiner
C. K. WEIFFENBACH, Assistant Examiner

U.S. Cl. X.R.

117—104, 219, 221, 223; 252—62.9